(12) United States Patent
Browne et al.

(10) Patent No.: US 8,104,820 B2
(45) Date of Patent: Jan. 31, 2012

(54) WIPER-BASED SUNSHADE AND METHODS OF USE

(75) Inventors: Alan L. Browne, Grosse Pointe, MI (US); Nancy L. Johnson, Northville, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 123 days.

(21) Appl. No.: 12/624,406

(22) Filed: Nov. 23, 2009

(65) Prior Publication Data

US 2010/0065232 A1 Mar. 18, 2010

Related U.S. Application Data

(63) Continuation-in-part of application No. 12/059,861, filed on Mar. 31, 2008.

(51) Int. Cl.
*B60J 3/00* (2006.01)

(52) U.S. Cl. .................................. 296/97.4; 160/370.23

(58) Field of Classification Search ............. 160/370.23, 160/84.07, 370.22, 370.21, DIG. 2, DIG. 3; 296/97.4, 97.7, 97.8, 97.9
See application file for complete search history.

(56) References Cited

U.S. PATENT DOCUMENTS

| | | | | |
|---|---|---|---|---|
| 2,141,023 | A * | 12/1938 | Ryan | 15/250.03 |
| 2,341,236 | A * | 2/1944 | Schnedler | 296/95.1 |
| 2,561,188 | A * | 7/1951 | Ferguson | 160/23.1 |
| 2,690,928 | A * | 10/1954 | Boynes | 296/95.1 |
| 5,657,810 | A * | 8/1997 | Levy et al. | 160/370.21 |
| 5,813,448 | A * | 9/1998 | Levy | 160/370.21 |
| 6,070,287 | A * | 6/2000 | Kornegay | 15/250.001 |
| 2003/0196769 | A1* | 10/2003 | Huang | 160/370.23 |
| 2007/0210606 | A1* | 9/2007 | Alacqua et al. | 296/97.8 |

* cited by examiner

*Primary Examiner* — David Purol

(57) ABSTRACT

Methods of deploying and stowing a sunshade utilizing a wiper-based system, including selectively engaging the sunshade and wiper, actuating the wiper, so as to deploy the shade, locking the wiper in the deployed position, so as to reduce the thermal load in a confined space, and returning the wiper after use, so as to stow the shade.

19 Claims, 3 Drawing Sheets

WIPER-BASED SUNSHADE AND METHODS OF USE

CROSS-REFERENCES TO RELATED APPLICATIONS

This U.S. Non-Provisional patent application is a continuation-in-part and claims the benefit of pending U.S. Non-Provisional application Ser. No. 12/059,861 filed on Mar. 31, 2008, entitled METHODS OF DEPLOYING A COVER UTILIZING ACTIVE MATERIAL AND AN EXTERNAL HEAT SOURCE (hereinafter the 861-Application), and incorporated by reference herein.

BACKGROUND

1. Field of the Invention

The present disclosure relates to methods of deploying sunshades, covers, screens, partitions, blinds, and the like (collectively referred to herein as "sunshades" or "shades"), and more particularly, to methods of deploying and retracting a sunshade over an exterior glazing utilizing an existing or modified wiper system associated therewith.

2. Discussion of Prior Art

A variety of sunshades have long been developed to serve as barriers to heat energy and/or direct exposure to variously the IR, UV, and visible portions of the solar spectrum. Manual and automatic methods of deploying sunshades have likewise been developed to facilitate deployment and increase effectiveness. However, various concerns relating to conventional designs remain in the art. In automotive settings, for example, exterior sunshades are typically applied manually, thereby requiring the presence of an occupant or user. Where an occupant is not present, the shade cannot be deployed. As a result, excessive temperature rise (and direct exposure of interior surfaces to solar radiation) in parked vehicles due to solar energy passing through glazing often occur, resulting at least in an unpleasant situation upon vehicle entry and more rapid degradation of UV sensitive interior materials. This thermal load is often reduced in accordance with the comfort level of the occupant(s) by cooling the interior cabin; however, this expends available energy and resources, which is of particular concern in electric and hybrid vehicles.

Thus, for these reasons and more, sunshades have been largely under-utilized. As such, there is a need in the art for an improved method of deploying and stowing sunshades.

BRIEF SUMMARY

Responsive to these concerns, an improved method of deploying and stowing a sunshade is provided by the present invention. Among other things, the invention is useful for blocking thermal energy and UV rays from entering the cabin of a vehicle (or otherwise confined space), thereby reducing the interior thermal load and extending the life and luster of structures therein. As such, the invention provides lower interior temperature, greater comfort upon vehicle entry, and reduced cooling demand. With respect to the latter, it is appreciated that extended vehicle driving range is also provided in electric and hybrid vehicle implementations. In a preferred embodiment, the method is useful for providing an automatic modus for deploying and retracting the sunshade that does not require the presence of an occupant or user, and takes advantage of existing wiper systems. Once deployed, the method is useful for holding the sunshade more securely in place. In an exemplary sampling, it was observed that the invention reduces solar loading in vehicles up to 2 kW.

Where active materials are utilized, the invention is further useful for accomplishing the translation of the shade without the use of electro-mechanical, pneumatic, or hydraulic means, which extends battery life and reduces the bandwidth of other intra-vehicle systems. More particularly, the invention, in certain embodiments, utilizes the natural reaction of active materials when exposed to an outside stimulus or activation signal to effect the connection, deployment, disconnection, and/or retraction of the cover. Whether through use of sensors or feedback control logic, the invention is yet further useful for effecting a smart system, wherein the shade is selectively deployed only in desirous conditions.

The inventive methods generally include the steps of connecting the sunshade to the wiper and a fixed structure defined, for example, by the cowl, roof, or hood of the vehicle, rotating the wiper to a deployed position, so as to expand the sunshade, locking the wiper in the deployed position, unlocking the wiper in the deployed position after use, returning the wiper to the stowed position, so as to collapse the sunshade, disconnecting the sunshade from the wiper or structure, and stowing the sunshade. Other aspects of the invention, including methods of autonomously performing the afore-mentioned steps, the use of active materials, and the release of stored energy, as well as various sunshade configurations are described in further detail herein.

Thus, it is understood and appreciated that the present invention provides a number of advantages over manually and electro-mechanically/magnetically/hydraulically deployed prior art systems. The above described and other features are exemplified by the following figures and detailed description.

BRIEF DESCRIPTION OF THE DRAWINGS

Preferred embodiments of the invention are described in detail below with reference to the attached drawing figures, wherein:

FIG. 1a is an enlarged perspective view of a wiper and cover shown in FIG. 1, particularly illustrating the actuator and attachment mechanism;

DETAILED DESCRIPTION

Figure 1:
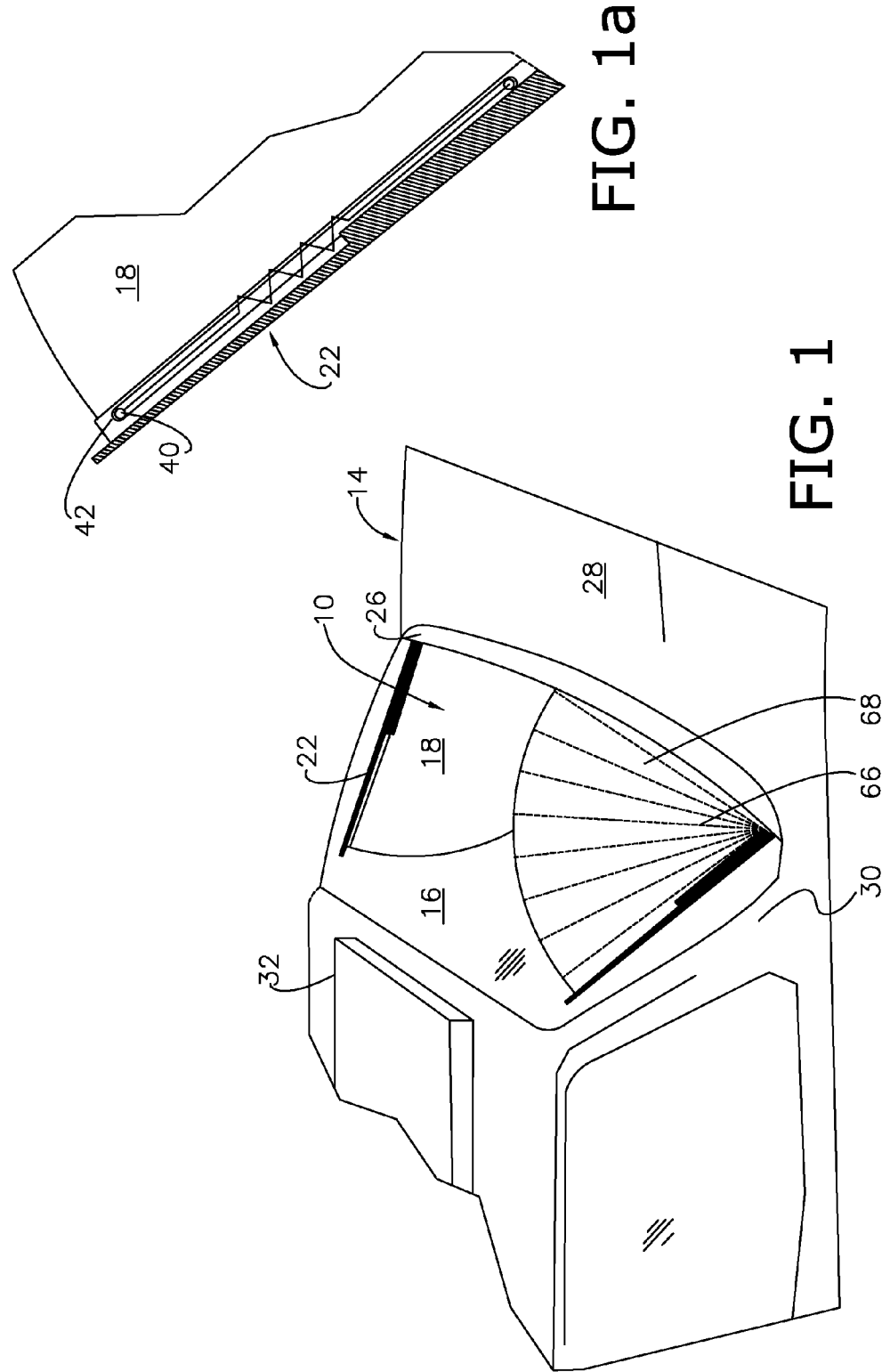
FIG. 1 is a perspective view of a sunshade comprising first and second covers overlaying the front windshield of a vehicle by selective attachment to and deploying of the windshield wipers, in accordance with a preferred method of the presenting invention.

The following description of preferred methods is merely exemplary in nature and is in no way intended to limit the disclosure. As best shown in FIG. 1, the present invention involves methods of deploying and stowing a sunshade 10 coupled to and driven by an existing or modified wiper system 12 of a vehicle 14; and more particularly, to a wiper system 12 associated with the front, rear, or side window glazings 16 of the vehicle 14. In general, the sunshade 10 includes at least one cover 18 and an attachment mechanism 20; and the wiper system 12 includes a wiper (generally including a blade and arm) 22, and a drive motor 24 drivenly coupled to the wiper 22. Although described herein with respect to vehicular applications, it is appreciated that the benefits of the present invention can be utilized in other settings; for example, in conjunction with the glazings of boats and aircrafts, to reduce solar loading in structures, such as high rise office buildings, in which exterior surface wiper systems for glazings are built in, or wherever windshield wiper systems are employed.

The term "sunshade" is not limited to the embodiments illustrated herein, and as previously mentioned, shall include, among other things, sunscreens, sun sheets, interfering window slats, and the like. The sunshade 10 is preferably reconfigurable, so as to facilitate storage, and may be of accordion, radial-accordion, or roll-up type, etc. That is to say, the sunshade 10 may be fanned out or pulled by the wiper 22 through various forms, in order to achieve a deployed condition, and then reversibly manipulated to achieve a stowed condition. The term "stowing" as used herein shall mean retracting and storing the shade once deployed.

In the illustrated embodiments, the sunshade 10 is disposed near a glazing 16 and the wiper system 12 selectively drives the reconfiguration of the sunshade 10, when engaged therewith (FIGS. 1-6b). In the deployed condition, the sunshade 10 is expanded, so as to cover at least a predominate portion and more particularly at least 75% of the glazing surface. The sunshade 10, during vehicle operation, when parked but at low ambient temperatures, or when there is no direct solar load, can be stowed, for example, in the cowl region 26, rear of the hood 28, glazing surroundings (e.g., pillars and headers thereof) 30, roof rack 32, or the wiper 22 itself. For example, the hood 28 of the vehicle may define a substantially enclosable storage compartment 34 (FIG. 3) adjacent the glazing 16 that is configured to receive the sunshade 10, and the attachment/return mechanisms. The attachment mechanism 20 functions to interconnect the sunshade 10 and an opposing structure, e.g., the wiper 22, cowl 26, etc., manually, through button activation, or by an SMA actuator/attachment either passively by thermal activation or Joule heating. Actuation of the wiper system 12 through a single full sweep is then effected either through button activation, a control logic sensor, or passively by heating of an SMA actuator.

Thus, the inventive methods may employ the reversible shape, stiffness, and/or shear strength change capabilities of different classes of "active materials" to deploy and/or stow the sunshade 10. The term "active-material based actuator" shall mean an actuator whose primary function is driven by at least one active material, wherein the term "active" or "smart" material shall be given its ordinary meaning as understood by those ordinarily skilled in the art. In the present invention, suitable active material actuators include shape memory alloy (SMA), electroactive polymer (EAP), piezoelectric, or thermoresponsive shape memory polymer (SMP) elements or wires, wherein the term "wire" is meant to encompass a range of geometric forms such as strands, strips, bands, cables, thin sheets, slabs, etc. A detailed explanation of these and other suitable active materials can be found in the 861-Application, and as such will not be repetitively provided here.

Figure 2:
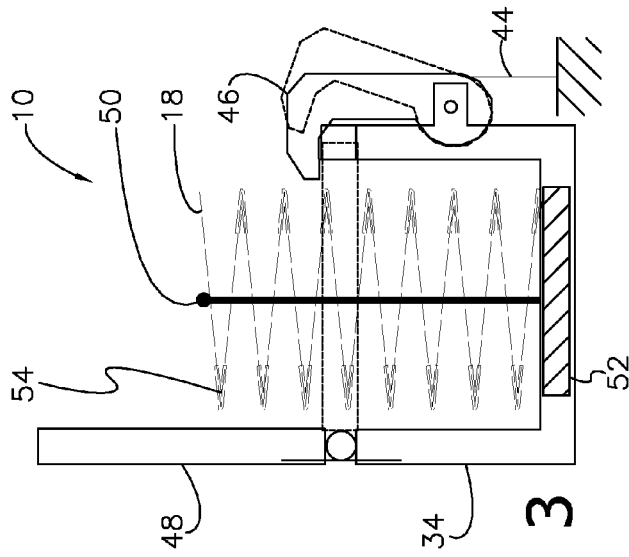
FIG. 2 is an elevation of a sunshade comprising first and second covers that are deployed from the cowl located between the vehicle glazing and hood.

It is appreciated that controls separate from the basic wiper controls (both physical and algorithmic) could be implemented for the sole purpose of operating the sunshade system 10. As shown in FIG. 2, a controller 36 is preferably coupled intermediate the wiper system 12 and sunshade 10. In autonomous embodiments, the controller 36 is programmably configured so as to autonomously effect the steps of the various methods described herein, and as such, includes sufficient software, processing and storage capabilities, as are readily determinable by those of ordinary skill in the art. The preferred controller 36 is adjustably configured, such that an occupant or user 24 is able to select one of a plurality of modes of operation. To that end, at least one input device (e.g., push button, switch, wheel, sensor, etc.) 38 is communicatively coupled and operable to send instructions or information to the controller 36.

For example, an input device 38 may be conveniently located within the interior cabin of the vehicle 14, so that the occupant can deliver input upon demand. In a preferred method, stowage may be initiated by the establishment of an open circuit, wherein electrical contact leads (not shown) are attached to a door and doorframe of the vehicle 14, the leads are brought to engage and close a charged circuit by closing the door, and opening the door results in the open circuit. In another embodiment, operation further includes automatically stowing the sunshade 10 after deployment for a predetermined period (such as retracting the shade automatically based on knowledge of the vehicle location and the time that sunset occurs at that location and day) or the occurrence of an event (e.g., cessation of solar loading).

As such, the preferred controller 36 is further coupled to at least one sensor 38 (FIG. 2) operable to detect a condition, such as the completion of a prerequisite step or the aforementioned occurrence or event. It is certainly preferable for the performance of full deployment methods to be selectively enabled or initiated, for example, by engaging the emergency parking brake, shifting the gear shift into park, or removing the starter key from the ignition switch. To that end, the preferred controller 36 may be communicatively coupled to one or more of these vehicular components directly through the bus. Moreover, the controller 36 may be further linked to existing vehicle sensors, such as moisture sensors for automatic wipers, so as to prevent deployment of the shade during rain, temperature sensors, so as to disable operation in cold weather conditions, and/or light sensors for automatic headlights, so as to disable operation in sufficiently dark conditions.

In the preferred embodiment shown in FIG. 1a, the attachment mechanism 20 includes opposite contact grips 40 configured to attach the sunshade 10 to the associated wiper 22. The mechanism 20 and wiper 22 are cooperatively configured and positioned, such that when the wiper 22 is in the home position, the contact grips 40 are automatically inserted within a race 42 defined by the wiper 22. Here, the grips 40 may be caused to move away from each other, so as to engage the ends of the race 60, thereby grabbing the wiper 22. Once engaged with the wiper 22, the sunshade 10 may be deployed by causing the wiper 22 to swing to the deployed position.

In operation, it is appreciated that deployment of the sunshade 10 could be accomplished in many ways, ranging from a fully manual operation, to fully automated deployment and stowage, and includes all combinations therebetween. In general, the preferred method includes some combination of the following steps: 1) disengagement of the wiper(s) 22 from its respective drive motor(s) 24, 2) release and/or unloading of the stowed sunshade 10, 3) attaching the sunshade 10 to an opposing member (e.g., the wiper 22 or otherwise structure, when the sunshade 10 is stored in the wiper 22), 4) rotation of the wiper 22 to the deployed position, 5) and locking the wiper 22 in the deployed position, to effect deployment; and further to effect storage from the deployed position, 6) unlocking the wiper 22 in the deployed position, 7) returning the wiper 22 to the stowed (e.g., home) position, 8) disconnecting the sunshade 10 from the opposing member, 9) stowing and/or securing the sunshade 10, and 10) re-engaging the wiper 22 and drive motor 24 for normal wiper operation.

Fully automated methods could utilize push button activation and various conventional and/or smart material actuators to accomplish one or more of these tasks. Where thermally activated smart material actuators are utilized, it is appreciated that passive heating from solar input may be used to provide the necessary energy to drive one or more of these functions or act as a release mechanism where an energy storage element (e.g., spring, etc.) is used to carry out the intended function.

It is appreciated that disengagement of the wiper 22 from the drive motor 24, locking and unlocking the wiper 22 in the deployed position, and re-engagement of the wiper 22 and motor 24 need to be performed only in the event that the existing wiper drive motor 24 is not to be used to drive automatic deployment, or where motor failure has occurred. Here, the wiper 22 is preferably configured so as to be decoupled from the motor 24 through a shaft, linkage, etc., and may be effected manually by releasing a clutch/locking device (not shown), or automatically by a separate trigger (e.g., push button, etc.), or as a step in an implemented deployment operation wherein an actuator (e.g., conventional or smart material based) performs the disengagement operation remotely via a coupling/decoupling device. As such, the preferred wiper system 12 further includes a manual latch or clamp, or an actuator (also not shown), such as a latching solenoid, magnetorheological clutch, or SMA driven clutch system. It is also appreciated that locking/clutching element could also be employed to prevent undesired motion by the sunshades 10, as especially caused by heavy winds.

Figure 3:
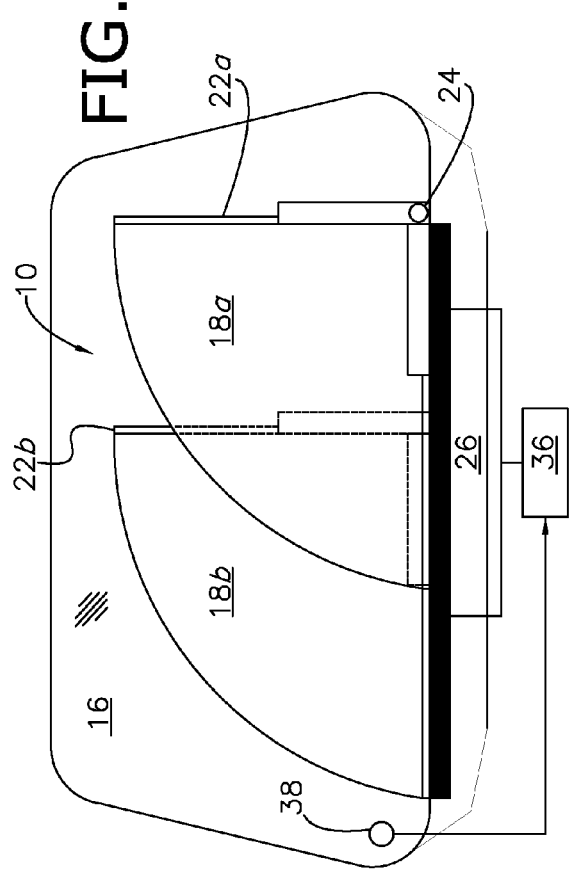
FIG. 3 is an elevation of a stowage compartment having a collapsed sunshade stored therein, wherein a latching mechanism has been manipulated by a shape memory actuator to enable access to the sunshade, in accordance with a preferred embodiment of the invention.

As previously mentioned, the preferred sunshade 10 is stowed in a storage compartment 34 or similar receptacle to avoid damage, dirt, inadvertent unfurling, vandalism, etc. Such a compartment 34 can be manually opened or automatically opened by a separate trigger (e.g., push button, etc.) or as a step in an implemented deployment operation where an actuator (e.g., conventional or smart material based) provides the necessary access. As shown in FIG. 3, for example, an SMA wire 44 may be drivenly coupled to a latch 46 shiftable between engaged and disengaged positions, and when in the engaged position, operable to hold down a spring biased door 48.

Stowing of the sunshade 10 could be accomplished by manual packing or automatic means. In either case the closing of the storage compartment 34 could be performed manually or by an actuator which, for example, rotates the compartment door 48 closed. Furthermore, the stowing of the shade 10 could be accomplished or enhanced using a retractable flexible cable 50 (FIG. 3) running along the lateral edge of the shade (e.g., vertically through a plurality of holes defined thereby). Once the deployment force is ceased, the cable 50 may be automatically retracted by a spring-biased or torsion bar 52, or by a rotary motor. Additionally, the cable 50 may be formed of shape memory material, operable to further promote retraction and stowage, when activated.

Smart material elements could also be incorporated into the shade to help stowage. For example, superelastic "V"-shaped SMA elements 54 (FIG. 3) could be incorporated into the folded edges of the shade 10, to help drive the folds closed. More particularly, when the shade 10 is deployed, induced stress causes the elements 54 to transform to their more malleable Martensitic state, thereby allowing a large degree of flattening. Once the deployment force, and therefore, the stress is ceased, the elements 54 return to their stiffer Austenitic state, thereby causing the shade 10 to collapse and fold.

Attaching and detaching (e.g., connecting and disconnecting) the sunshade 10 to the wiper 22 or fixed structure may be accomplished manually, or automatically as initiated by a separate trigger (e.g., push button, etc.) or as a step in an implemented deployment operation which employs conventional and/or smart material actuators. To that end, the shade 10 is attached to the wiper 22 by a releasable attachment mechanism 20, such as, but not limited to, clips, a zipper-type mechanism 56 (FIG. 4a), at least one hook 58 (FIG. 4b), or magnetic elements 60 (FIG. 4c), etc. With respect to the latter, it is appreciated that, where the wiper 22 comprises ferrous material, a permanent magnet(s) 60 could be incorporated into the leading edge of the shade 10 that would attach to the wiper 22 (or conversely, as shown in FIG. 4c). This magnet 60 could be strengthened electro-magnetically, so as to temporarily increase the attraction force during automatic deployment, by applying an electric current to a coil 62 coaxially aligned therewith. The coil 62 could further be used to cancel the field of the permanent magnet 60 by reversing the current therein, in order to detach the shade from the wiper 22. In this configuration especially, attachment may be facilitated by driving the wiper 22 in reverse, past the home position, so as to intrude into the cowling/rear hood area.

Figure 4A:
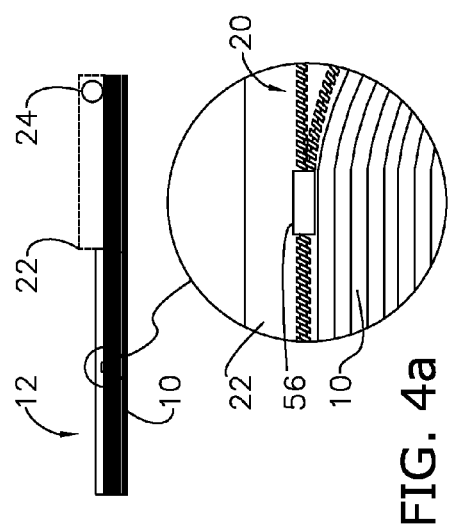
FIG. 4a is an elevation of a wiper and collapsed sunshade particularly illustrating, in enlarged caption view, a zipper-type attachment mechanism interconnecting the sunshade and wiper, in accordance with a preferred embodiment of the invention.
Figure 4B:
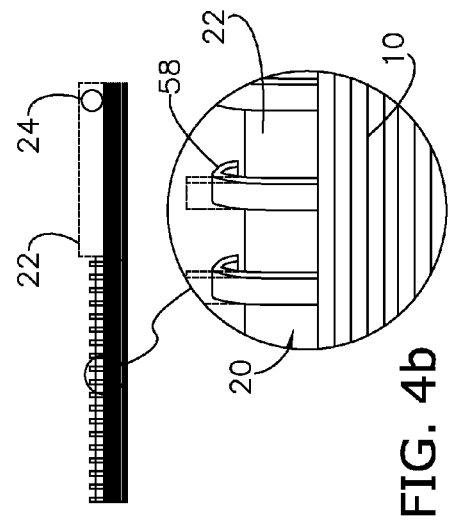
FIG. 4b is an elevation of a wiper and collapsed sunshade particularly illustrating, in enlarged caption view, a plurality of smart material hooks fixedly attached to the sunshade and partially encompassing the wiper, in accordance with a preferred embodiment of the invention.
Figure 4C:
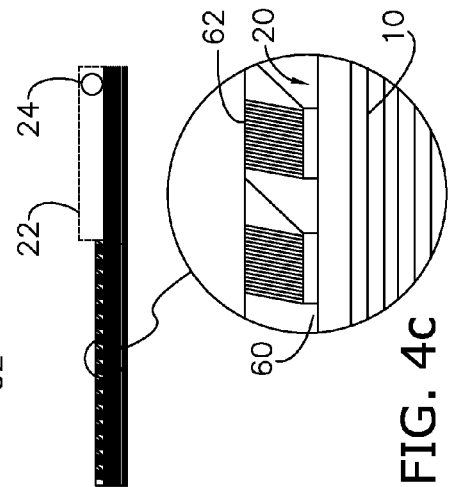
FIG. 4c is an elevation of a wiper and collapsed sunshade particularly illustrating, in enlarged caption view, a plurality of magnetic elements fixedly attached to the wiper and magnetically engaging the sunshade, in accordance with a preferred embodiment of the invention.

More particularly, FIG. 4a shows a preferred embodiment, wherein a zipper-type mechanism 56 is manually or autonomously operated by a motor or actuator (e.g., bow-string SMA wire), and operable to selectively join the wiper 22 and sunshade 10. By locating the zipper 56 nominally near the wiper pivot, it is appreciated that the sunshade 10 will undergo minimal movement during normal wiper operation, such that the leading edge thereof may remain entrained by the zipper 56. FIG. 4b shows another embodiment, wherein a plurality of shape memory hooks 58 are off-centered along the leading edge of the sunshade 10 and configured to achieve a curved "engaging" profile preferably when deactivated, and a straight "releasing" profile preferably when activated. As shown in FIG. 4b, when the wiper 22 is adjacent the leading edge, the hooks 58 may be activated, so as to partially enclose the wiper 22. Actuation of the wiper 22 to the deployed position, in this configuration, will cause the sunshade 10 to expand.

The wiper 22 is rotated to unfurl the sunshades 10, and reversibly to stow the shade 10 either manually, or automatically by a separate trigger or as a step in an implemented deployment operation where an actuator (conventional or smart material based) performs the rotary motion. In the illustrated embodiments, the existing wiper motor 24 is advantaged to that end; however, it is certainly within the ambit of the invention to utilize alternative driving means, including an active material actuator (e.g., spooled SMA wire, etc.) drivenly coupled to the wiper 22. Again, it is appreciated that where a thermally activated smart material actuator is used, the heat source may be provided by the Sun, which emits radiation across most of the electromagnetic spectrum, which would thereby result in a smart system 10 that deploys only when needed and enabled.

Figure 5:
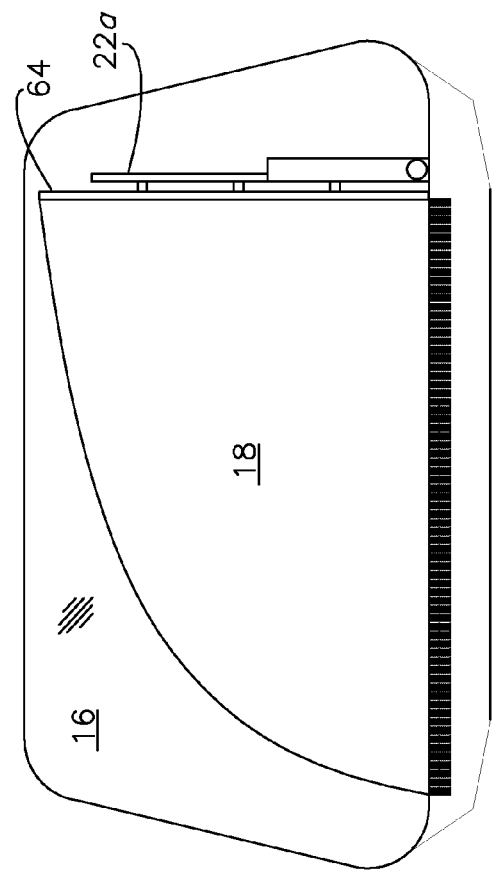
FIG. 5 is an elevation of a vehicle glazing, and sunshade comprising a single cover and longer secondary arm that is selectively attached to the primary wiper, in accordance with a preferred embodiment of the invention.
Figure 6A:
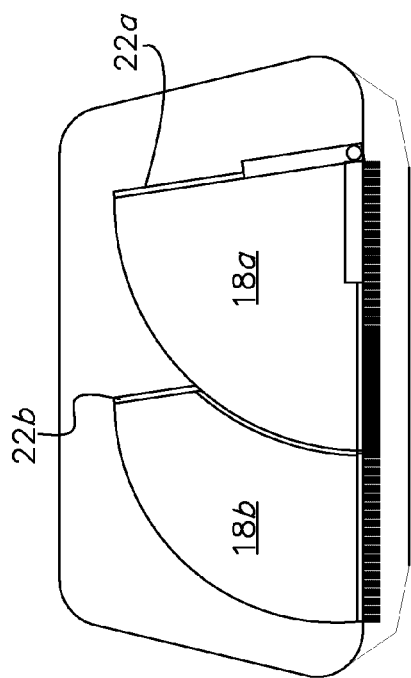
FIG. 6a is an elevation of a vehicle glazing, and a first example of a sunshade comprising first and second covers having differing geometric shapes that result in no overlap when deployed, in accordance with a preferred embodiment of the invention.
Figure 6B:
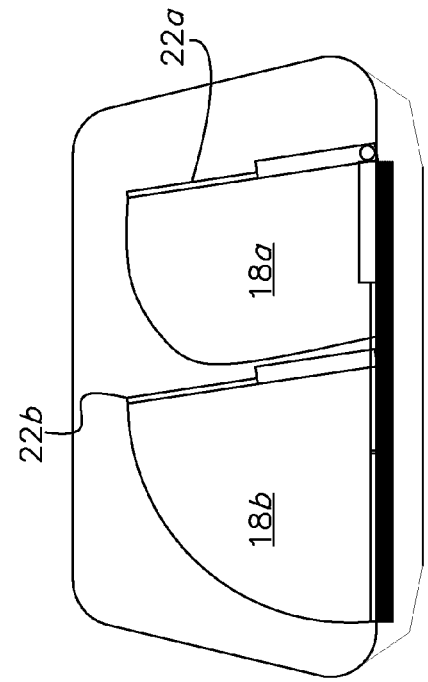
FIG. 6b is an elevation of a vehicle glazing, and a second example of a sunshade comprising first and second covers having differing geometric shapes that result in no overlap when deployed, in accordance with a preferred embodiment of the invention.

The shade deployment could be accomplished by dual covers 18a,b, as shown in FIGS. 1, 2, and 6a,b, or as a single cover 18 spanning preferably the full width of the glazing 16, and deployed by a primary wiper (e.g., the driver's side wiper) 22a, as shown in FIG. 5. With respect to the latter, and to effect a greater sweep, a longer secondary arm 64 attached to the leading edge of the sunshade 10 may be selectively coupled to the driving wiper 22a and/or motor 24, and engaged only when sunshade deployment is desired. The wiper 22a and arm may use one or more of the afore-mentioned attaching means, such as electro-magnetism.

Additionally, it is appreciated that both the single and double cover concepts may need to overcome interference concerns between the sunshade 10 and the wipers 22 themselves. To that end, the sunshade 10 may be caused to deploy above, so as to pass over, the interior wiper 22b, for example, by engaging a conventional or smart material actuator that lifts the sunshade 10 and/or primary wiper 22a away from the glazing 16. The primary wiper 22a may be lowered once the shade 10 is fully deployed or as part of the retracting and stowing phases. Alternatively, the covers 18a,b of a dual sunshade 10 may be geometrically configured, so as to minimize interference therebetween. That is to say, the covers 18a,b preferably present shapes that minimize, and more preferably result in no overlap when both are deployed, as exemplarily shown in FIGS. 6a,b.

The sunshade 10 may be collapsed and stored in a number of manners, including but not limited to folding, and rolling around a cylinder, cone, or the like. The preferred sunshade 10 incorporates stiffening members 66 similar to the tines of an umbrella, or along the shade edges, so as to increase the structural stability of the deployed shade 10 as well as potentially provide natural folding locations for shade stowage. Here again superelastic SMA could provide the desired rigidity while also supplying a robustness to the aggressive folding and bending of a stowage operation. Finally, it is appreciated that each cover 18 may consist of smaller, overlapping panels 68, or define at least one slit, so as to enable air passage while offering a barrier to radiation.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A method of deploying and stowing a reconfigurable sunshade utilizing a wiper sub-system comprising a wiper and motor drivenly coupled to the wiper, said method comprising the steps of
   a) connecting the sunshade to the wiper and a fixed structure;
   b) rotating the wiper to a deployed position, so as to expand the sunshade;
   c) locking the wiper in the deployed position;
   d) unlocking the wiper in the deployed position;
   e) returning the wiper to the stowed position, so as to collapse the sunshade;
   f) disconnecting the sunshade from the wiper or structure; and
   g) stowing the sunshade.

2. The method as claimed in claim 1, wherein step b) further includes the steps of disengaging the wiper from the drive motor, when the wiper is in the stowed position, and further comprising:
   h) re-engaging the wiper and motor.

3. The method as claimed in claim 2, wherein step b) further includes autonomously engaging and disengaging the wiper and motor using an actuator selected from the group consisting essentially of a latching solenoid, a magnetorheological clutch, and an SMA driven clutch system.

4. The method as claimed in claim 1, wherein step a) further includes the steps of autonomously releasing and unloading the sunshade from a stowage compartment.

5. The method as claimed in claim 4, wherein step a) further includes the steps of activating an SMA wire and manipulating the compartment, so as to provide access to the sunshade as a result of activating the wire.

6. The method as claimed in claim 1, wherein steps a), b), c), d), e), f), and/or g) further includes the steps of activating an active material element, and manipulating the wiper or sunshade, as a result of activating the element.

7. The method as claimed in claim 6, wherein the element is selectively exposed to solar energy, so as to be passively activated.

8. The method as claimed in claim 6, wherein activating the element releases stored energy.

9. The method as claimed in claim 1, wherein the method is adapted for use with a vehicle comprising a cowl, roof rack, and/or glazing surrounds, and step g) further includes the steps of stowing the sunshade in the cowl, roof rack, glazing surrounds, and/or wiper.

10. The method as claimed in claim 1, wherein the sunshade is communicatively coupled to an input device configured to receive an input, and at least a portion of steps a)-g) are performed only when the input is received.

11. The method as claimed in claim 10, wherein the sunshade is communicatively coupled to a sensor configured to detect a condition, and said at least portion of steps a)-g) are restricted from performance when the condition is detected.

12. The method as claimed in claim 11, wherein the condition is selected from the group consisting essentially of shifting a gearshift to or from park, opening or closing a door, detecting moisture, detecting a temperature below a threshold, and detecting sunlight.

13. The method as claimed in claim 1, wherein step e) further includes the steps of retracting a cable entrained by the sunshade and collapsing the sunshade as a result of retracting the cable.

14. The method as claimed in claim 1, wherein step e) further includes the steps of incorporating SMA elements within the sunshade, and activating SMA elements.

15. The method as claimed in claim 1, wherein steps a) and f) further include the steps of manipulating at least one clip, hook, zipper-type mechanism, or magnetic element and connecting or disconnecting the sunshade as a result thereof.

16. The method as claimed in claim 15, wherein the wiper comprises ferrous material, the sunshade presents a permanent magnet along the leading edge, and the magnetic element is an electromagnetic coil operable to increase the attraction between the material and magnet when a current is caused to flow therein, and cancel the attraction when the current is reversed.

17. The method as claimed in claim 1, wherein steps a) and f) further include the steps of connecting and disconnecting the wiper to a longer secondary arm attached to the sunshade.

18. The method as claimed in claim 1, wherein the sunshade comprises first and second covers, steps a)-g) are performed by selectively engaging the covers to first and second wipers, and the covers are geometrically configured so as to result in no overlap therebetween, when deployed.

19. The method as claimed in claim 1, wherein the sunshade comprises first and second covers, step a)-g) are performed by selectively engaging the covers to first and second wipers, and step b) further includes the initial step of lifting the first wiper so as to clear the second wiper.

* * * * *